United States Patent [19]

Anderson et al.

[11] Patent Number: 4,640,219

[45] Date of Patent: Feb. 3, 1987

[54] APPARATUS FOR COATING MATERIALS ONTO ELONGATED FOODSTUFFS

[75] Inventors: James E. Anderson, Madison; Terry L. Holmes, Monona, both of Wis.

[73] Assignee: Oscar Mayer Foods Corporation, Madison, Wis.

[21] Appl. No.: 698,297

[22] Filed: Feb. 5, 1985

[51] Int. Cl.[4] .............................................. B05C 19/00
[52] U.S. Cl. ..................................... 118/24; 118/308; 118/316; 406/133
[58] Field of Search ................ 118/24, 308, 410, 411, 118/612, 316; 406/133; 222/630

[56] References Cited

U.S. PATENT DOCUMENTS

| | | | |
|---|---|---|---|
| 1,695,123 | 12/1928 | Poston | 118/308 X |
| 2,571,065 | 10/1951 | Schneider | 118/410 X |
| 2,783,097 | 2/1957 | Goins | 406/133 X |
| 3,496,699 | 2/1970 | Quarve | 118/DIG. 4 |
| 3,717,752 | 2/1973 | Warning | 118/24 X |

Primary Examiner—John P. McIntosh
Attorney, Agent, or Firm—Richard D. Schmidt; Joseph T. Harcarik; Daniel J. Donovan

[57] ABSTRACT

An apparatus for the application of coating material onto elongated food products wherein the applicator nozzle and nozzle opening portion of the apparatus correspond to the side surfaces of the elongated food product. The food product to be coated is passed before nozzles discharging impelled coating material from a coating material supply source that meters desired amounts of coating material to the blower device.

18 Claims, 5 Drawing Figures

APPARATUS FOR COATING MATERIALS ONTO ELONGATED FOODSTUFFS

BACKGROUND OF THE INVENTION

1. FIELD OF THE INVENTION

This invention relates to apparatus for the application of coating materials on elongated food products.

2. DESCRIPTION OF THE PRIOR ART

For many years cooks and food processors have been coating various foodstuffs with an assorted array of materials ranging from spices to sugars and glazes. The coating of foods is done mostly for culinary reasons but an attempt is made to apply such coatings in a manner that is aesthetically pleasing as well.

Prior to this invention food processors had to allocate substantial manpower to the task of hand applying coating materials to elongated foodstuffs. Even with sufficient manpower the process of hand applying an even coating to all surfaces of an elongated food product requiring such such is quite time consuming. The process of hand applying a coating renders it difficult to coat all surfaces at one time. The elongated food product must be manually manipulated and each surface done separately. In addition to the above mentioned problems, the coating applied manually is not uniformly nor evenly applied and is not as aesthetically pleasing as is desired.

Over the years, various attempts have been made to reduce the amount of manpower needed to coat elongated foodstuffs or to apply a coating in a more even and uniform manner.

Still today, the most commonly used method of applying coatings to elongated foodstuffs is to apply the coating manually.

Accordingly, the present invention provides an apparatus for the even and uniform application of coating materials to elongated food products while reducing manpower cost and time involved for coating such food products.

SUMMARY OF THE INVENTION

It is an object of the invention to provide a material coating apparatus that will apply coating materials to elongated food products in an even and uniform manner.

Another object of the invention is to provide a material coating apparatus that will reduce the manpower requirements for applying coating materials to elongated food products.

Another object of the invention is to reduce the time required for applying coating materials to elongated food products.

Another object of the invention is to provide an apparatus for applying coating materials to more than one side surface of an elongated food product at one time.

Still another object of the invention is to provide an apparatus for applying coating material to all side surfaces of an elongated food product at one time.

These and still further objectives are addressed hereinafter.

The foregoing objects are achieved by passing a specifically oriented elongated food product, at a predetermined rate, past an applicator nozzle that is designed and shaped to correspond to the shape of the side surface of said food product. The coating material is supplied to the applicator nozzle by means of an adjustably metered supply hopper feeding a blower which impels the coating material through the applicator nozzle and onto the side surfaces of the passing elongated food product. When two or more applicator nozzles are used it is possible to evenly and uniformly coat all side surfaces of the elongated food product in one pass past the applicator nozzles.

BRIEF DESCRIPTION OF THE DRAWINGS

FIG. 3 is a side view of two applicator nozzles corresponding to the side surfaces of the multi-side elongated food product interspersed between.

DETAILED DESCRIPTION OF THE INVENTION

Figure 1:
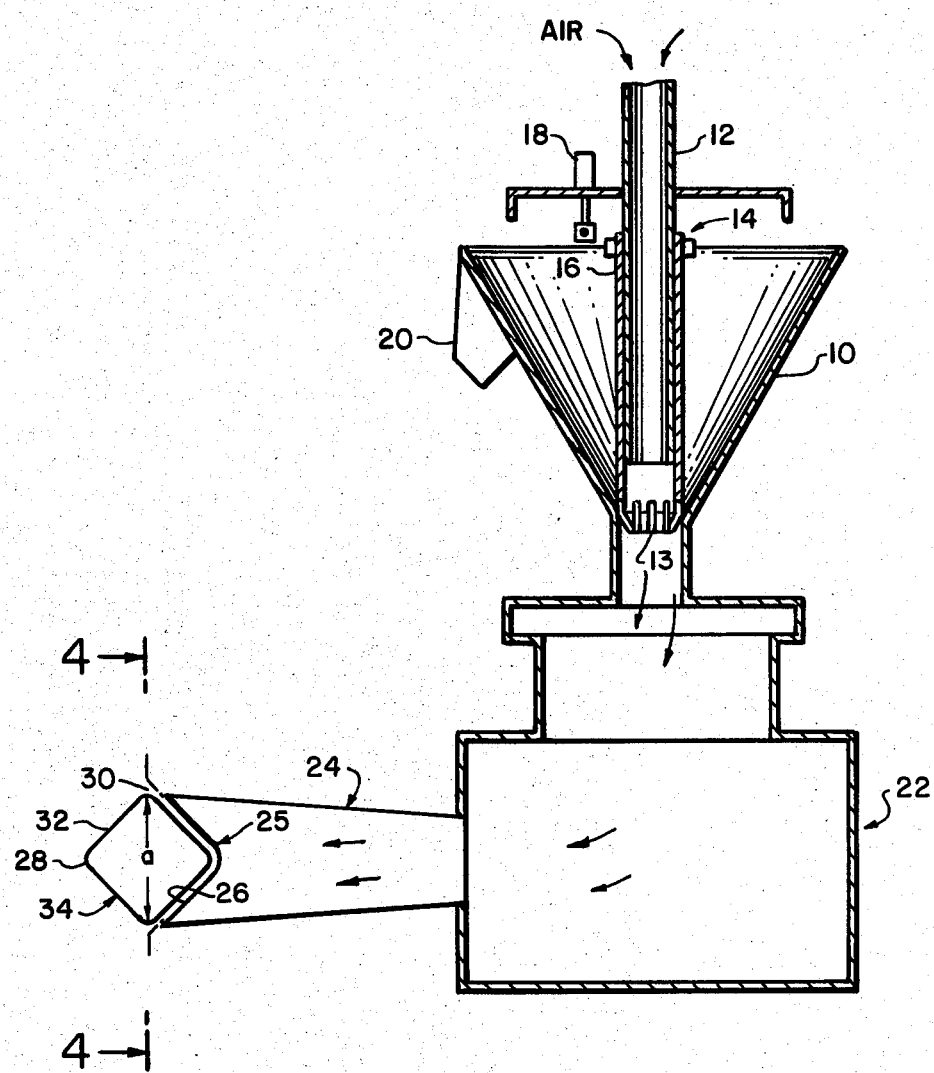
FIG. 1 is a schematic side view of the coating material application apparatus.

Referring now more particularly FIG. 1, there is shown at 10 a supply hopper for the coating material. For example, the coating material might be black pepper, red pepper, paprika, salt, sugar or the like. This list is to be taken as suggestive and not as limiting.

Figure 2:
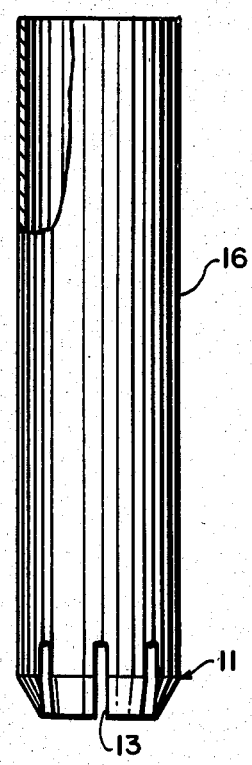
FIG. 2 is a side view of the first or outer slotted tube of the hopper discharge means.

The metered coating material delivery means 14 is made up of two tubes 12 and 16 within the hopper 10 and extending from above said hopper and continuing down through the center and out the discharge opening of the hopper. The first or outer tube 16 is slotted FIG. 2, 11 and 13 to allow the coating material within the hopper to pass through said slots and exit the hopper. The inner tube 12 adjustably recipocates upwardly and downwardly within the outer tube by means of an air cylinder 18. By raising and lowering the inner tube the flow of coating material in the hopper and flowing through the outer slotted tube can be increased, decreased or stopped. A vibrating means 20 is attached to or is in contact with the hopper to ensure a steady flow of coating material from the hopper.

Figure 3:
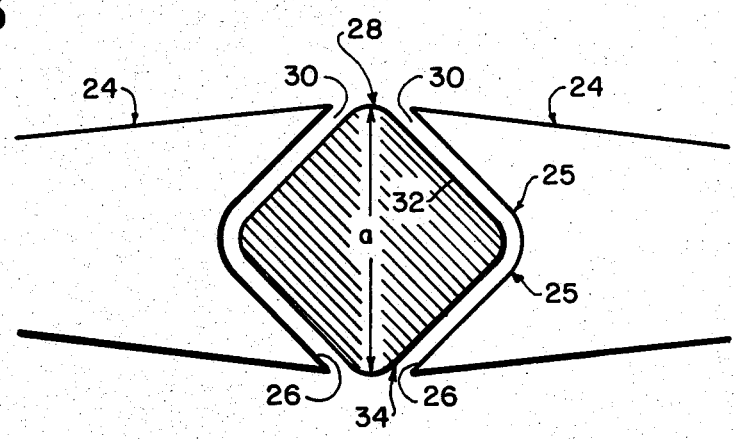
Figure 4:
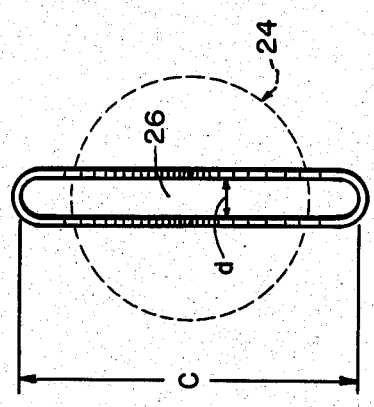
FIG. 4 is an end view of the discharge end of an applicator nozzle.

From the hopper and metered coating material delivery system the coating material enters an air blower device 22 which impels the coating material through the applicator nozzle 24 in a uniform pattern onto the food product 34 to be coated. To ensure that the coating material evenly and uniformly coats a complete side surface 32 of the food product the applicator nozzle opening 26 must be substantially the same vertical width C in FIG. 4 as the food product diagonal width A. The vertical width of the nozzle can be slightly less than or greater than the diagonal width of the food product depending upon how close the applicator nozzle opening is to the food product side surfaces, shown as space 30. It has been found that the optimal distance between the applicator nozzle and food product is in the range from about ¼" to 1". Additionally, the horizontal width D is less than the vertical width C of the applicator nozzle opening. FIG. 3 shows an elongated food product 34 in position between two applicator nozzles 24.

While two hoppers with adjustable metered delivery means and two blowers with one applicator nozzle each have been shown to produce satisfactory results, it is expected that two nozzles eminating from one blower with an adjustable coating material delivery means may work provided that the blower impels the coating material with sufficient velocities and volume of air to enable division of the air flow to each nozzle.

The side configuration 25 of the discharge end of the applicator nozzle and nozzle opening is critical. When coating a rectangular or square sided food product, the multi-sided elongated or loaf shaped product is oriented prior to being conveyed past the nozzles and impelled coating material at about a 45° angle to the nozzles, FIG. 3. In other words the corner 28 to two side surfaces of the food product is positioned so as to directly face the applicator nozzle. The discharge end of the applicator nozzle is designed, in its preferred form, such that when the preoriented food product is conveyed past the applicator nozzle, two side surfaces of the food product are simultaneously coated in one pass past the applicator nozzles. This side configuration 25 of the discharge end of the nozzle is accomplished by conforming the side configuration of the nozzle discharge with the side configuration of the two side surfaces and corner of the elongated food product.

For example, if the two food product side surfaces form a 90° angle then the discharge end of the applicator nozzle 25 is cut back at a 45° angle to conform to those surfaces and is inwardly V-shaped with the open end of the V-shape facing the corner 28 and side surfaces 32 to be coated as shown in FIG. 3. If the food product is cylindrical or circular in shape, then the discharge end of the applicator is cut back and made concave to correspond to the side surfaces of the food product.

A variable speed conveying means is employed to convey the food product past the applicator nozzles at a constant rate. When conveying a multi-sided, elongated food product in a horizontal or length-wise position and with the food product side surfaces at a 45° angle to the applicator nozzles it is preferable to use two conveying means. The first conveying means conveys the uncoated, horizontal, preoriented, elongated food product towards the applicator nozzles. The second conveying means conveys the coated, elongated food product away from the applicator nozzles.

Figure 5:
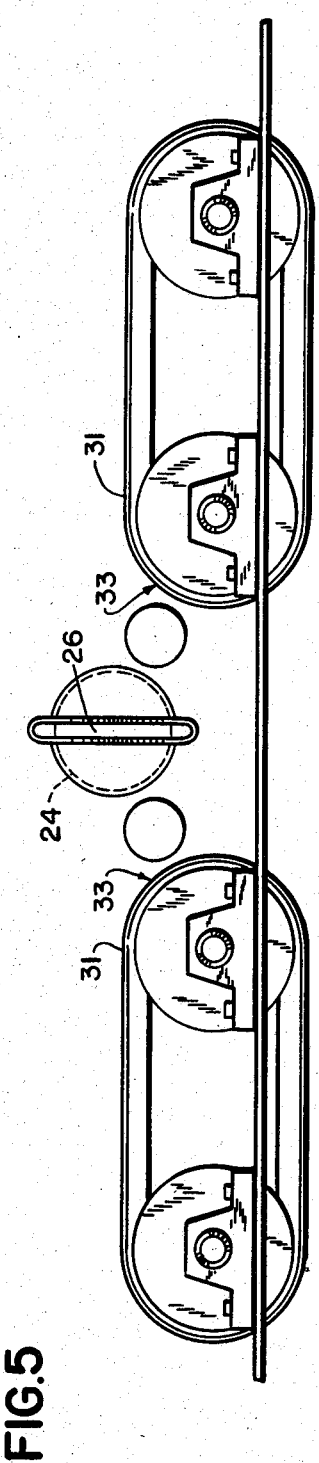
FIG. 5 is a side view of the discharge end of an applicator nozzle interposed between two conveying means.

The applicator nozzles 24 are positioned so as to apply the coating material onto the horizontal elongated food product as it is discharged from the first conveying means and prior to the elongated food product engaging the second conveying means as seen in FIG. 5. By positioning the applicator nozzles between the two conveying means 33 the coating material is applied at a time when the food product is unsupported by any belts 31 or the like and hence, is unobstructed. This allows all side surfaces of an elongated food product to be coated at one time.

A good example of an elongated food product is hams. They can be produced in various shapes and sizes. Moisture is such that no additional moisture need be placed on the outside surfaces to ensure adequate adhesion of the coating material. Other elongated food products such as beef and poulty products may be coated by the present apparatus whether or not moisture need be placed on the side surfaces.

For generally good manufacturing practice it is advisable that at least the food product to be coated, applicator nozzles and nozzle openings be within a dust control means.

The dust control means will usually consist of either a positive or negative pressure enclosure about, at least, the applicator nozzle or nozzles and the coating material application area of the conveying means. Such dust control means is not limited to the above and may take the form of any control means available or that may become available in the industry.

What is claimed is:

1. A coating material application apparatus for coating an elongated food product that comprises: means for conveying said food product at a predetermined rate past an applicator nozzle, said conveying means further comprising an area of non-support; an applicator nozzle for dispersement of coating material onto said food product, said applicator nozzle comprising a body structure having a vertical width substantially greater than the horizontal width, said vertical width being substantially equal to the diameter of a cylindrical food product or the diagonal width of a square or rectangular food product, a nozzle discharge, and an opening sufficient to evenly coat about one-half of said food product side surfaces and said nozzle discharge and having an ellipical, semi-circular, or angular configuration conforming to said food product side surfaces, said applicator nozzle positioned at said conveying means area of non-support; and a blower means for impelling coating material through said opening of said applicator nozzle.

2. A coating material application apparatus as claimed in claim 1 further comprising a metered coating material delivery means adjustably adaptable to vary the amount of coating material delivered to said blower means.

3. A coating material application apparatus as claimed in claim 2 wherein said metered coating material delivery means comprises: a concically shaped hopper; a slotted tube through which said hopper contents pass and are discharged from said hopper; a second tube adjustably reciprocating upwardly and downwardly within said slotted tube effectuating an increase, decrease or stoppage of coating material discharged from said hopper; a means for adjustably moving said second tube upwardly and downwardly; and a vibrating means for said hopper.

4. A coating material application apparatus as claimed in claim 1 wherein said means for conveying said food product comprises: a first conveying means for conveying the uncoated elongated food product towards said applicator nozzle; a second conveying means for conveying the coated elongated food product away from said applicator nozzle; a space between said first and second conveying means of sufficient distance to allow said food product to be coated as said food product is conveyed from said first conveying means toward said second conveying means.

5. A coating material application apparatus as claimed in claim 4 wherein said applicator nozzle is positioned between said first conveying means and said second conveying means such that the coating material is applied as said food product is discharged from said first conveying means and prior to said food product engaging said second conveying means.

6. A coating material application apparatus as claimed in claim 1 where said applicator nozzle and nozzle opening discharge said coating material in a uniform pattern sufficient to evenly coat at least two side surfaces of a multi-sided elongated food product wherein said food product is conveyed past said applicator nozzle and nozzle opening.

7. A coating material application apparatus as claimed in claim 1 wherein said applicator nozzle and nozzle opening discharge said coating material in a uniform pattern sufficient to evenly coat about one-half of the side surfaces of an elongated cylindrical food product whenever said food product is conveyed past said applicator nozzle and nozzle opening.

8. A coating material application apparatus as claimed in claim 1 wherein said conveying means conveys a multi-sided elongated food product in a position such that the food product side surfaces are at a 45° angle to the applicator nozzle.

9. A coating material application apparatus as claimed in claim 1 wherein said elongated food product is conveyed past said applicator nozzle at a distance sufficiently close to said nozzle to effectuate the deposition of a constant and even coating of coating material thereon.

10. A coating material application apparatus as claimed in claim 9 wherein said distance is within the range from about ¼" to 1".

11. A coating material application apparatus as claimed in claim 1 that further comprises a dust control means.

12. A coating material application apparatus as claimed in claim 1 wherein said food product conveying means and applicator nozzle are contained within a dust control means.

13. A coating material application apparatus as claimed in claim 1 wherein said angular configuration is inwardly V-shaped with the open end of said V-shape oriented toward the product side surfaces.

14. A coating material application apparatus for coating an elongated food product that comprises: means for conveying said food product at a predetermined rate past an applicator nozzle at a distance sufficiently close to said nozzle to effectuate the disposition of a constant and even coating of coating material thereon; an applicator nozzle having a rectangular or cylindrical body structure having a vertical width greater than the horizontal width, said vertical being substantially equal to the diameter of a cylindrical food product or the diagonal width of a square or rectangular food product; the applicator nozzle discharge end conforming to the elliptical, semi-circular or angular shape of said elongated food product side surfaces; an opening in said applicator nozzle sufficient to evenly coat about one-half of said food product side surface; said applicator nozzle positioned so as to apply said coating material at a position along said means for conveying said food product where said food product side surfaces are unobstructed by said means for conveying; a blower means for impelling coating material through said opening of said applicator nozzle; a coating material supply hopper; a slotted tube through which said hopper contents pass and are discharged from said hopper; a second tube adjustably reciprocating upwardly and downwardly within said slotted tube effectuating an increase, decrease or stoppage coating material discharged from said hopper; a means for adjustably moving said second tube upwardly and downwardly; and a vibrating means for said hopper.

15. A coating material application apparatus for coating an elongated food product as claimed in claim 14 wherein said means for conveying further comprises: a first conveying means for conveying uncoated elongated food product towards said applicator nozzle; a second conveying means for conveying coated elongated food product away from said applicator nozzle; both said first and second conveying means positioned so as to leave unsupported said elongated food product as it is discharged from said first conveying means and prior to engaging said second conveying means.

16. A coating material application apparatus for coating all side surfaces of an elongated food product that comprises: a means for conveying said food products at a predetermined rate past a plurality of applicator nozzles, said conveying means further comprising an area of non-support; a plurality of applicator nozzles for substantially even dispersement of coating material onto said food product, wherein each applicator nozzle further comprises a body structure having a horizontal width and a vertical width, said vertical width being greater than said horizontal width, said vertical width being substantially equal to the diameter of a cylindrical food product or the diagonal width of a square or rectangular food product; and a nozzle discharge end and opening shaped to substantially conform to the curvature of the product side surfaces, and sufficient to evenly coat about one-half of said product side surfaces; said plurality of applicator nozzles arranged to coat substantially all side surfaces of said food product; said plurality of applicator nozzles positioned so as to apply said coating meterial at a position along said means of conveying where said food product side surfaces are unsupported by said conveying means; blower means for impelling coating material through each opening of each of said plurality of applicator nozzles; and a metered, coating material delivery means adjustably adaptable to vary the amount of coating material delivered to said blower means.

17. A coating material application apparatus for coating all side surfaces of a multi-sided, elongated food product that comprises: a conveying means for conveying said food product at a predetermined rate past two applicator nozzles such that said conveying means further comprises an area of non-support; two applicator nozzles each having an angular configuration in the shape of a V at the discharge end of said applicator nozzle with the open end of said V-shape oriented toward the multi-sided, elongated food product side surfaces; an opening in each of the two applicator nozzles having dimensions sufficient to evenly coat about one-half of said multi-sided, elongated food product side surfaces; said two applicator nozzles positioned along said means of conveying so as to apply said coating material on said food product at a position where said food product side and end surfaces are unobstructed and unsupported by said means for conveying; two blower means for impelling coating material through a corresponding applicator nozzle and nozzle opening; a separate metered coating material delivery means for each of said blower means, adjustably adaptable to vary the amount of coating material delivered to each of said blower means; said metered coating material delivery means comprising a slotted tube through which said coating material can pass and a second tube adjustably reciprocating upwardly and downwardly within said slotted tube effectuating an increase, decrease or stoppage of coating material passing through said slotted tube.

18. A coating material application apparatus for coating all side surfaces of a multisided, elongated food product as claimed in claim 17 wherein said conveying means further comprises: a first conveying means for conveying uncoated food product towards said two applicator nozzles; a second conveying means for conveying coated food product away from said two applicator nozzles; both said first and second conveying means positioned so as to leave unsupported said elongated food product as it is discharged from said first conveying means and prior to engaging said second conveying means.

* * * * *